United States Patent
Liedtke et al.

(10) Patent No.: US 7,540,721 B2
(45) Date of Patent: Jun. 2, 2009

(54) AUTOMATIC INLET CHECK VALVE RELEASE

(75) Inventors: Stephen K. Liedtke, Chanhassen, MN (US); Timothy W. Zeigler, Independence, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 454 days.

(21) Appl. No.: 11/192,471

(22) Filed: Jul. 29, 2005

(65) Prior Publication Data
US 2007/0025863 A1    Feb. 1, 2007

(51) Int. Cl.
*F04B 49/00* (2006.01)
*F04B 53/00* (2006.01)
(52) U.S. Cl. .................. 417/290; 417/298; 417/440
(58) Field of Classification Search .......... 417/290, 417/298, 440
See application file for complete search history.

(56) References Cited

U.S. PATENT DOCUMENTS

| 3,411,673 A | | 11/1968 | Mann |
| 3,682,574 A | * | 8/1972 | Sanders ................ 417/12 |
| 3,820,922 A | | 6/1974 | Buse et al. |
| 4,022,381 A | * | 5/1977 | Karliner ................ 239/126 |
| 4,102,610 A | * | 7/1978 | Taboada et al. ......... 417/417 |
| 4,390,324 A | | 6/1983 | Karliner |
| 5,027,902 A | * | 7/1991 | Dickinson et al. ........ 166/369 |
| 5,099,871 A | | 3/1992 | Cowan |
| 5,172,717 A | * | 12/1992 | Boyle et al. ............ 137/155 |
| 5,306,122 A | * | 4/1994 | Gebauer et al. .......... 417/383 |
| 6,358,024 B1 | * | 3/2002 | Djordjevic ............. 417/487 |
| 2004/0219027 A1 | | 11/2004 | Anderson |

FOREIGN PATENT DOCUMENTS

EP    1403516 A2    3/2004

OTHER PUBLICATIONS

International Search Report and Written Opinion of International Application No. PCT/US2006/029737, filed Jul. 26, 2006; both mailed Dec. 7, 2006.

\* cited by examiner

*Primary Examiner*—Devon C Kramer
*Assistant Examiner*—Philip Stimpert
(74) *Attorney, Agent, or Firm*—Faegre & Benson LLP

(57) ABSTRACT

Apparatus and method for releasing a stuck inlet check valve of a paint pump including a solenoid connected to the check valve with a pusher element which momentarily displaces a moveable element such as a ball in the check valve to break any adhesion between the movable element and a valve seat. A control provides a single pulse of energy to the solenoid each time power is applied to the pump. The control includes an SCR connected between a full wave rectifier and a coil of the solenoid, with gate current removed from the SCR to commutate the SCR after a predetermined time interval after power is applied.

3 Claims, 6 Drawing Sheets

AUTOMATIC INLET CHECK VALVE RELEASE

BACKGROUND OF THE INVENTION

This invention relates to the field of paint pumps having an inlet check valve. In the past, such paint pumps have frequently experienced an inlet check valve stuck in the closed position, because of inadequate cleaning from a prior use. When paint remains in the inlet check valve, the movable element (typically a ball) is adhered to the seat, and inlet suction of the pump is often inadequate to break the adhesion. In the past, such a condition was evidenced by the pump failing to draw paint from a reservoir, and required disassembly of the inlet check valve to free the movable element from the seat, causing inconvenience and delay to the pump operator.

The present invention addresses and overcomes the problem of a stuck inlet valve by providing an automatic inlet check valve release, which operates to break any such adhesion between the movable element and the seat automatically each time the pump is readied for operation.

SUMMARY OF THE INVENTION

In one aspect the present invention is an automatic inlet check valve release which operates to release a movable element of the check valve from adhesion to a seat in the check valve each time electrical power is applied.

In another aspect, the present invention is a liquid tight assembly of a solenoid and inlet check valve to prevent contamination of the solenoid by paint.

In another aspect, the present invention is an electrical circuit that provides a pulse of energy to the solenoid each time electrical power is applied.

In yet another aspect, the present invention is the combination of the automatic inlet check valve release for paint pumps which has a liquid tight assembly of a solenoid and check valve and a control for the solenoid which momentarily energizes the solenoid each time electrical power is applied to the pump.

DETAILED DESCRIPTION OF THE INVENTION

Figure 1:
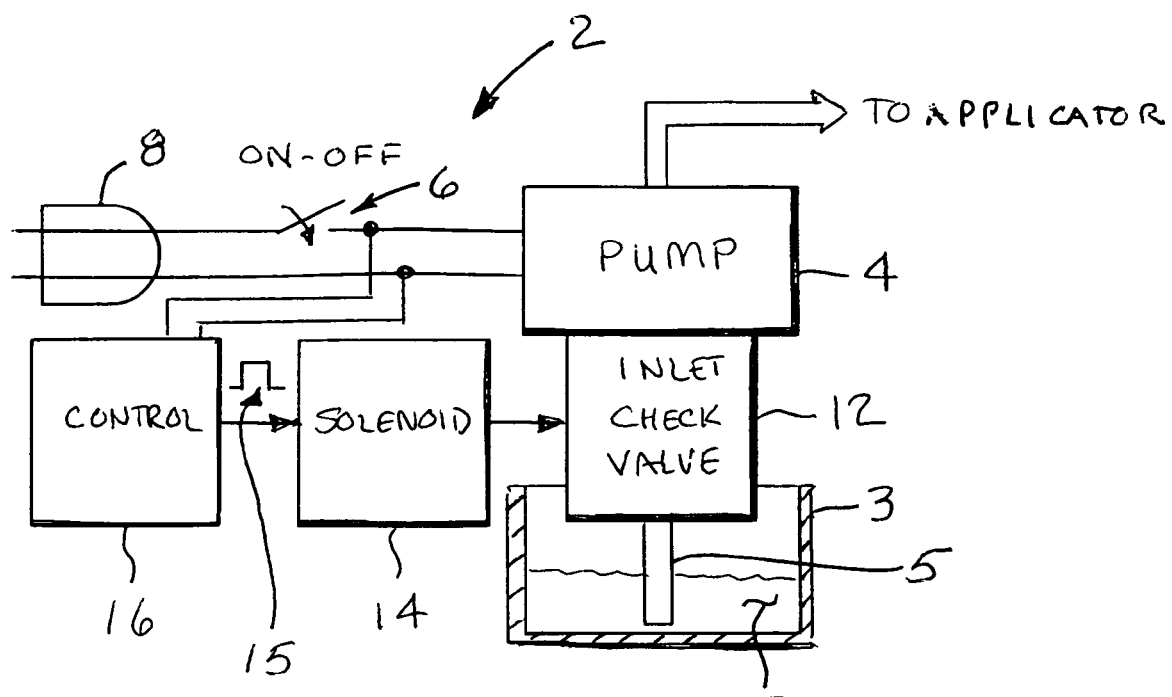
FIG. 1 is a simplified block diagram of a pump system useful in the practice of the present invention.

Referring now to the Figures, and most particularly, to FIG. 1, a system 2 for the present invention may be seen. System 2 includes a paint pump 4 having an ON-OFF switch 6 connected to electrical power via a plug 8. A paint reservoir 3 provides a source of liquid coating material 7 (referred to herein as paint) via a suction tube or apparatus 5 to an inlet check valve 12 associated with and in fluid communication with the pump 4. When the switch 6 is turned ON, the pump 4 is energized to deliver paint to a paint applicator or sprayer, such as a spray gun (not shown). However, if the inlet check valve is not properly cleaned, a movable element in the check valve may be adhered (by dried paint) to a valve seat, preventing paint from being suctioned by the pump. The present invention has a control 16 that momentarily activates a solenoid 14 (as indicated by pulse 15) to momentarily displace the movable element from the seat in the check valve 12, to break such adhesion.

Figure 2:
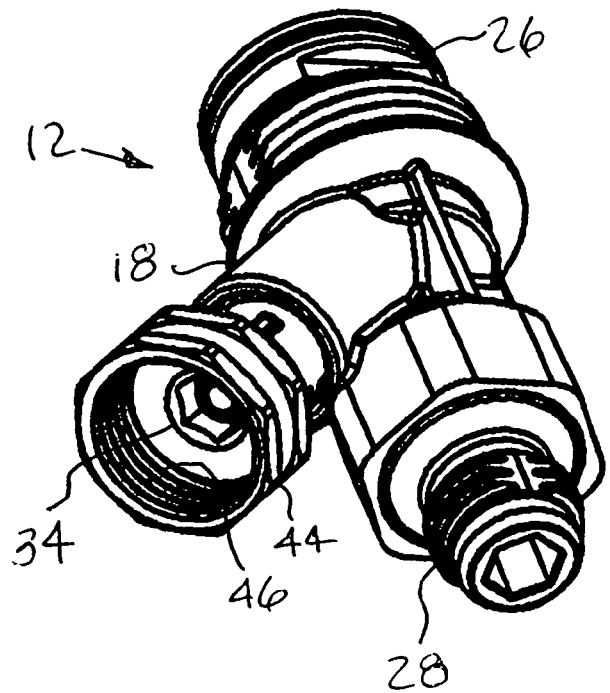
FIG. 2 is a perspective view of an inlet check valve useful in the practice of the present invention.
Figure 3:
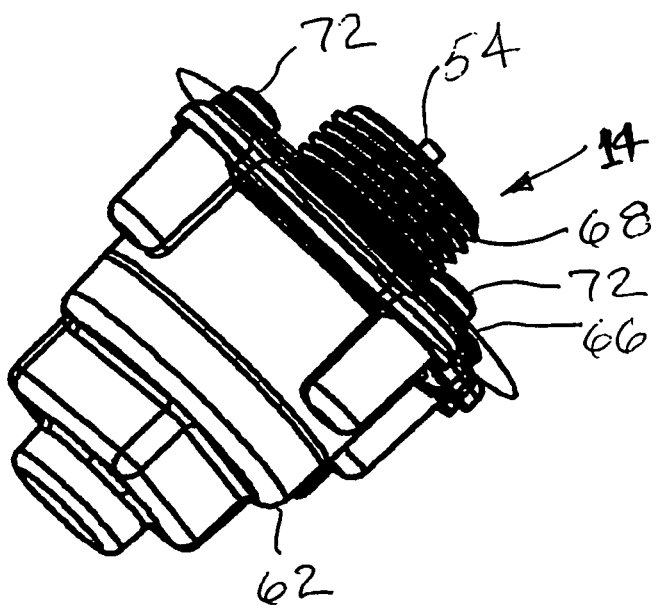
FIG. 3 is a perspective view of a solenoid useful in the practice of the present invention.
Figure 4:
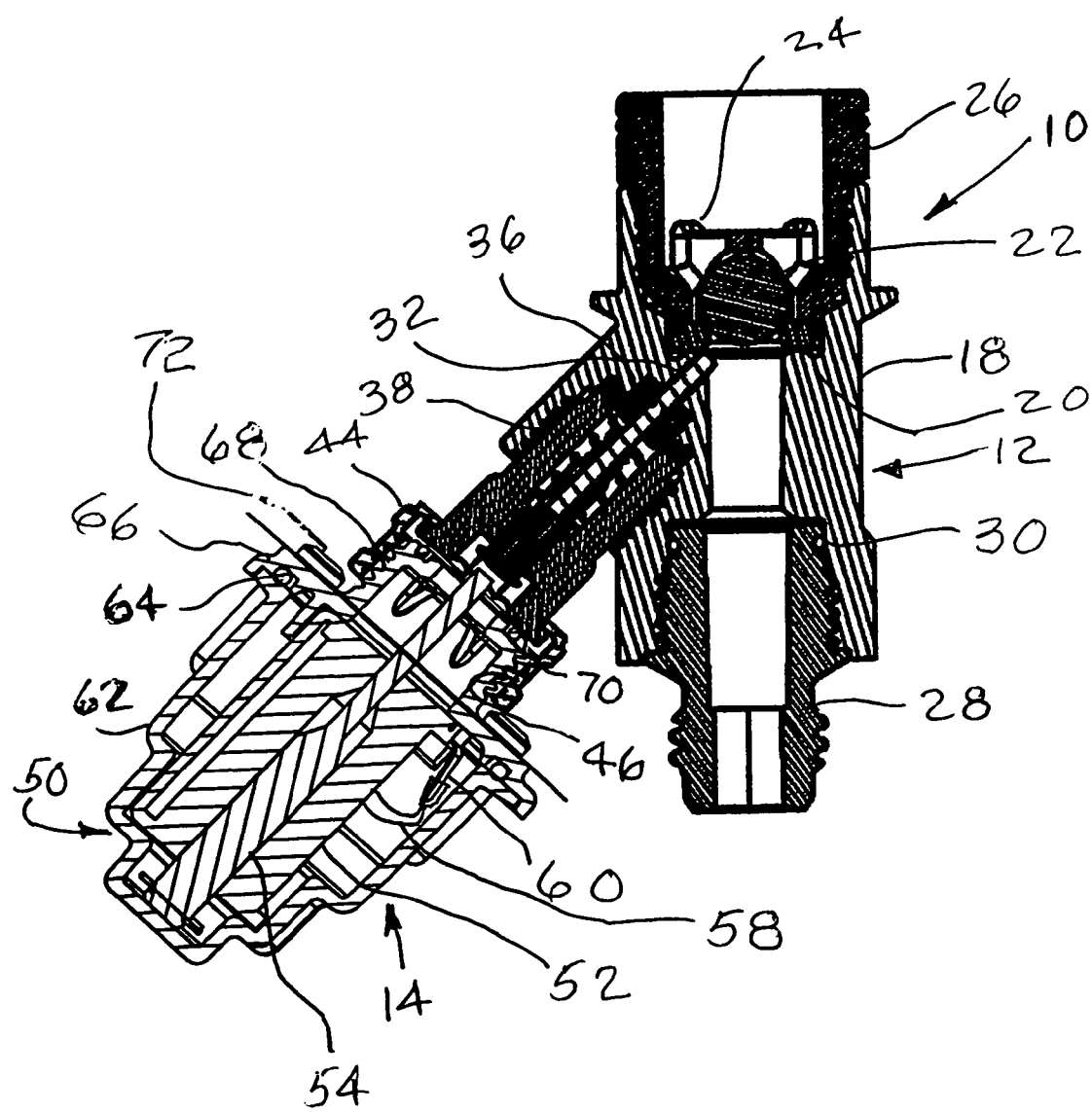
FIG. 4 is a section view of an assembly including the inlet check valve of FIG. 1 and the solenoid of FIG. 2.
Figure 7:
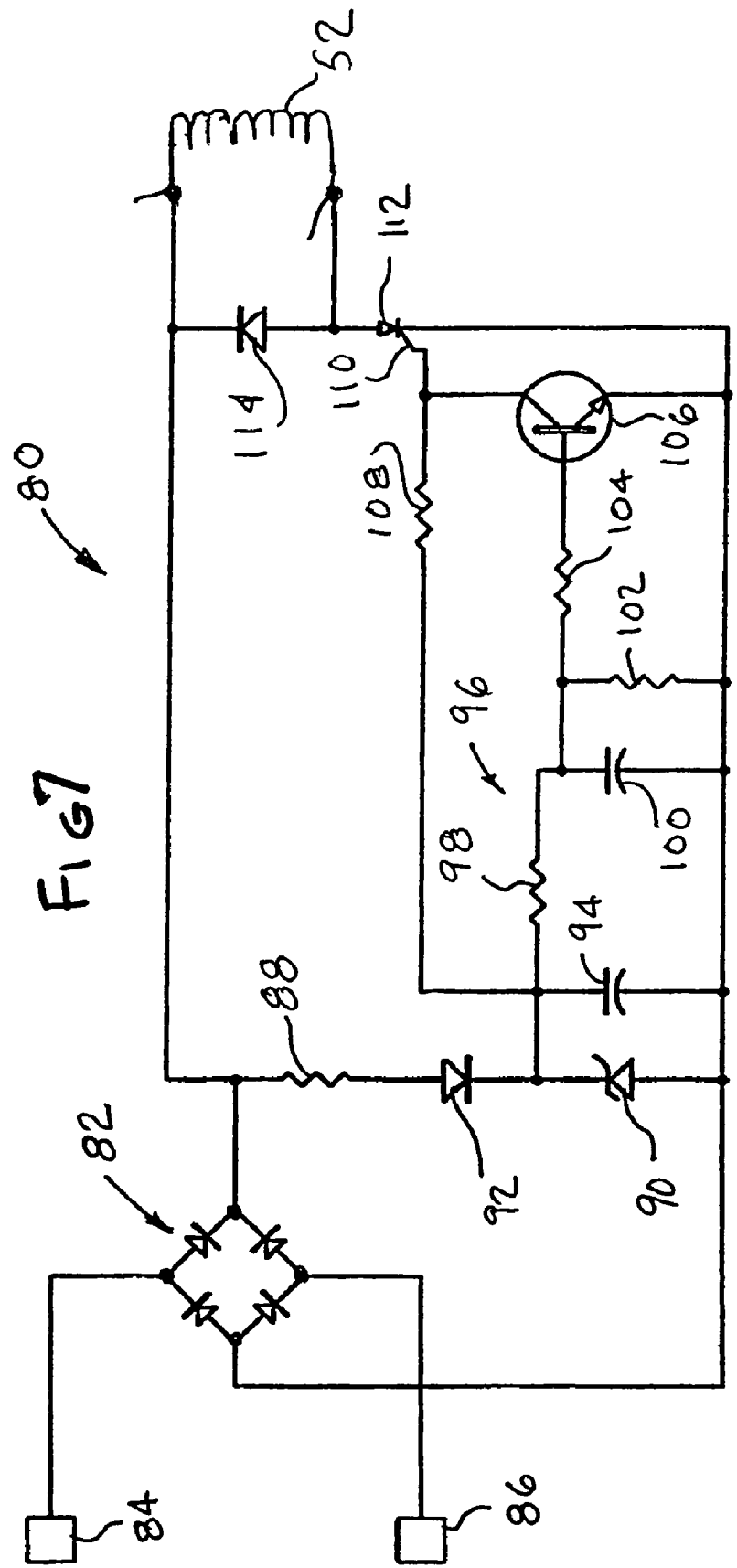
FIG. 7 is an electrical schematic of a control for the solenoid.

Referring now to FIGS. 2, 3 and 4, an apparatus 10 having an inlet check valve 12 and a solenoid 14 may be seen. Apparatus 10, together with a suitable control, makes up an automatic inlet check valve release mechanism. One form of control is shown in FIG. 7 and is described infra.

Figure 5:
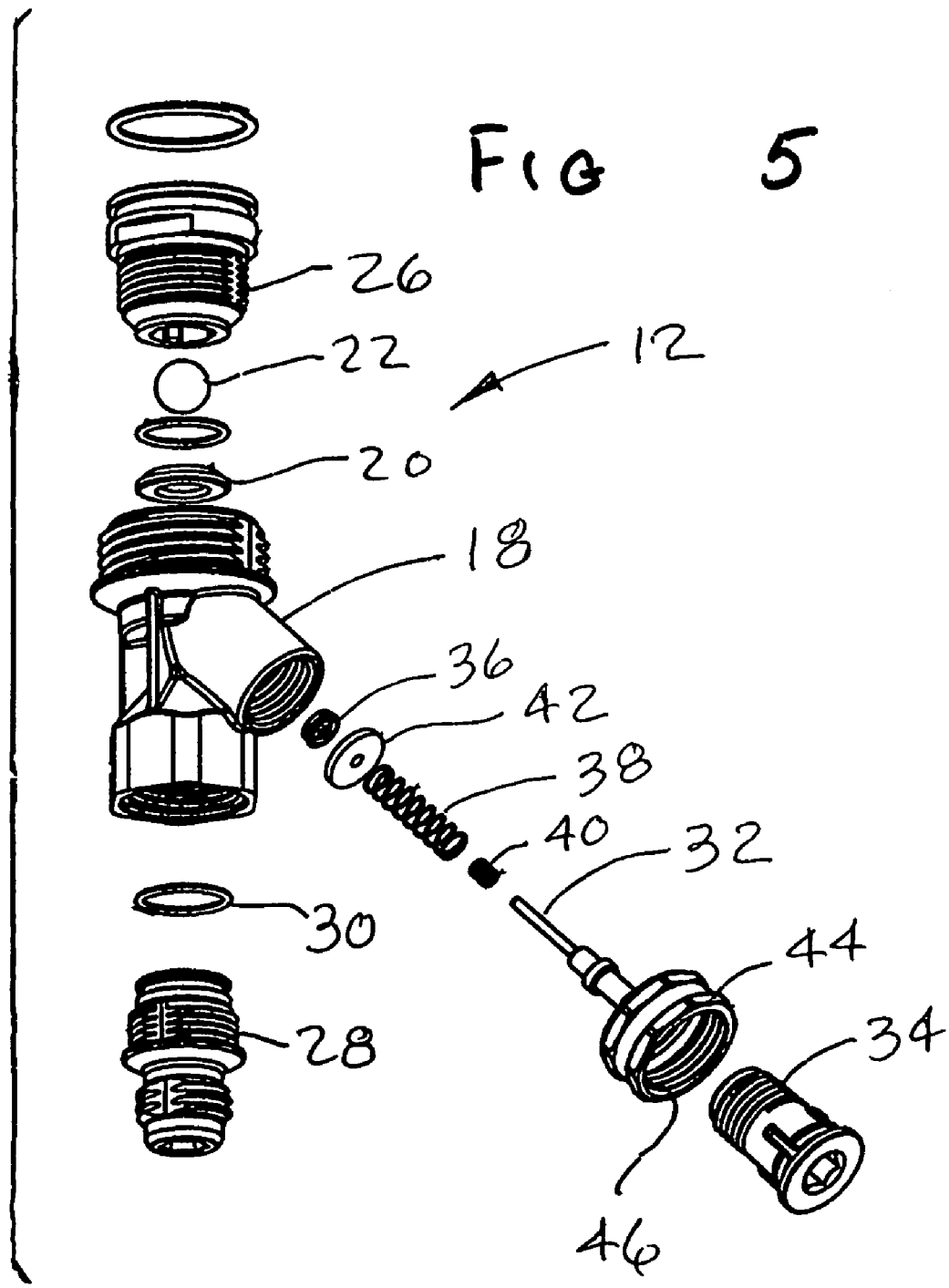
FIG. 5 is an exploded view of the inlet check valve of FIG. 1.

Referring now also to FIGS. 4 and 5, the check valve 12 of apparatus 10 includes an inlet fitting or housing 18, a valve seat 20, which may be made of carbide, and a movable element in the form of a ball 22, it being understood that other movable elements may be used in the inlet check valve while remaining within the scope of the present invention. Ball 22 is retained in proximity to seat 20 by a cage 24 formed integrally with a retainer 26. A suction set inlet fitting 28 may be threaded into housing 18 and sealed to the housing with an O-ring 30. Suction set inlet fitting 28 is adapted to receive and secure a suction tube 5 or other suction apparatus such as an extended suction set (not shown).

A ball pusher stem 32 is retained to housing 18 by a solenoid inlet fitting 34. A seal 36 is received on stem 32 to seal stem 32 to housing 18. A large spring 38 and a small spring 40 are received on stem 32 and urge stem 32 away from ball 22 by reacting against a washer 42. A nut 44 is loosely captured on inlet fitting 34 and has internal threads 46 to receive and mate with the solenoid 14. Threads 46 may be conventional garden hose fitting threads.

Figure 6:
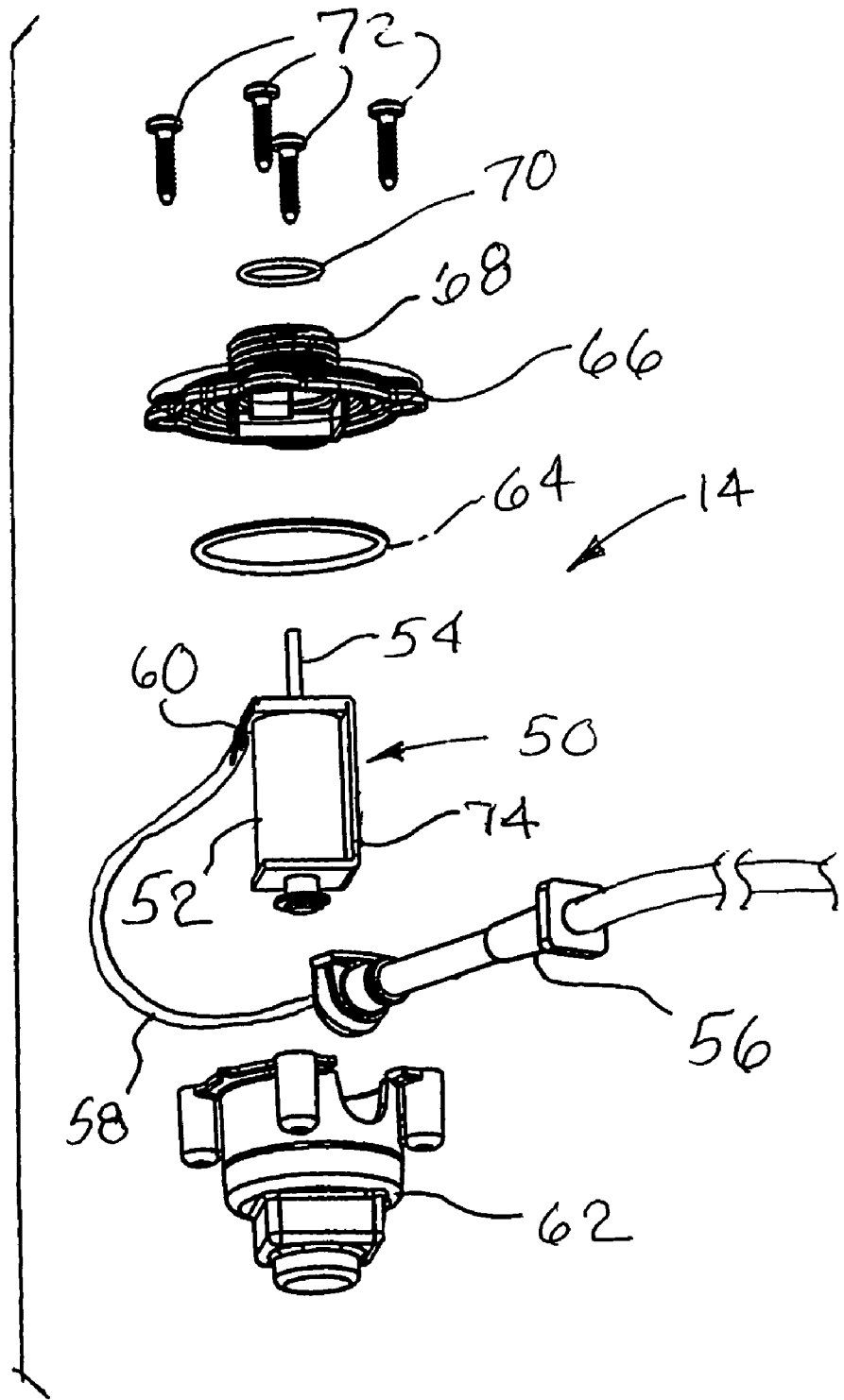
FIG. 6 is an exploded view of the solenoid of FIG. 2.

Referring now most particularly to FIGS. 4 and 6, the solenoid 14 includes an assembly 50 having a coil 52 and a plunger 54, with the plunger 54 free to move axially with respect to the coil 52. An electrical power cord 56 has a pair of insulated conductors 58 connected to terminals 60 on assembly 50 to provide electrical power to coil 52 when desired. An enclosure 62, together with a cover 66 surrounds assembly 50 and provides a liquid-tight container for assembly 50 and cord 56 by sealing with an O-ring 64 against solenoid enclosure cover 66. Cover 66 has male threads 68 sized to mate with threads 46, and an O-ring 70 provides a seal between cover 66 and housing 18 to complete the liquid tight arrangement for the combination of the solenoid 14 and check valve 12. Threaded fasteners 72 secure cover 66 to enclosure 62. Although not shown, a ground connection from cord 56 may be secured to a metal frame 74 of assembly 50.

Referring now to FIG. 7, a circuit 80 of control 16 for solenoid 14 may be seen. Circuit 80 includes a full wave bridge 82 connected to terminals 84, 86 which receive 120VAC electrical power. A 20K ohm resistor 88 supplies DC power to a 9 volt zener diode 90 through a diode 92 which has a 22 microfarad filter capacitor 94 connected across it, along with a low pass filter 96 made up of a 470K ohm resistor 98 and a 10 microfarad capacitor 100. A 1 Meg ohm resistor 102 is connected across capacitor 100, to discharge capacitor 100 when power is removed. A 1 K ohm resistor 104 provides base current to an NPN transistor 106. A 10K ohm resistor 108 is connected between the 9 volt regulated supply of the zener diode 90 and the gate connection 110 of an SCR 112 which controls power to the coil 52 of the solenoid 14. A back diode 114 is connected across coil 52. Transistor 106 is preferably a type 2N3904 and SCR 112 is preferably a type EC103D.

Operation of the automated inlet pusher valve release is as follows. Each time power is applied to the pump to which apparatus 10 is connected, for example, when an ON-OFF switch (not shown) is turned from OFF to ON, circuit 80 will provide a pulse of energy sufficient to cause plunger 54 to move stem 32 forward, displacing ball 22 from seat 20, after which pulse the plunger 54 and stem 32 will retract (because of springs 38 and 40), allowing the ball 22 to thereafter seat and unseat against seat 20 as the inlet check valve 12 operates to suction paint to the pump to which apparatus 10 is attached. Such momentary ball displacement serves to break any adhesion between ball 22 and seat 20 at the beginning of pump operation.

More particularly, when initially energized, circuit 80 provides gate current through resistor 108 via gate terminal 110, momentarily turning on SCR 112 and energizing coil 52. Once the low pass filter 96 times out, the transistor 106 will shunt gate current away from gate terminal 110. Once gate current is removed from SCR 112, the next time the unregulated DC available at terminals 60 falls toward zero, SCR 112 will shut off when the current through it falls below the holding current level sufficient to maintain conduction. Thereafter transistor 106 remains in a conducting state, keeping SCR 112 turned off for the duration of operation of the pump (not shown). Once power is removed from terminals 84, 86 (for example when the ON-OFF switch (not shown, but to be understood to be connected in series with one of terminals 84 or 86) is turned OFF, resistor 102 will "reset" the circuit 80 by discharging capacitor 100, after which the circuit will be ready to supply a single pulse to momentarily displace the ball in check valve 12 again when power is reapplied.

This invention is not to be taken as limited to all of the details thereof modifications and variations thereof may be made without departing from the spirit of the invention. For example and not by way of limitation, other forms of control 16 may be utilized, such as a momentarily closed relay, while still remaining within the scope of the presently claimed invention.

What is claimed is:

1. A method of automatically breaking adhesion of a moveable member to a seat in an inlet check valve of a paint pump comprising the steps of:
   a. energizing a solenoid when electrical power is applied to the pump;
   b. advancing a pusher into engagement with the moveable member using the solenoid;
   c. moving the movable member out of contact with the seat;
   d. thereafter retracting the pusher by deenergizing the solenoid; and wherein steps a, b, and c are momentary and step d continues for the duration of time while electrical power is continuously applied to the pump.

2. A method of automatically breaking adhesion of a moveable member to a seat in an inlet check valve of a paint pump comprising the steps of:
   a. momentarily energizing a solenoid through an SCR when electrical power is applied to the pump;
   b. advancing a pusher into engagement with the moveable member using the solenoid;
   c. moving the movable member out of contact with the seat; and
   d. thereafter retracting the pusher by deenergizing the solenoid for the duration of operation of the pump.

3. The method of claim 2 wherein step d. is performed by removing gate current from the SCR.

* * * * *